(No Model.)

T. O. DECKER.
VELOCIPEDE.

No. 463,302. Patented Nov. 17, 1891.

Witnesses:
J. Halpenny
G. Nystrum

Inventor:
Thomas O Decker
By Gidley & Hopkins
His Attorneys.

UNITED STATES PATENT OFFICE.

THOMAS O. DECKER, OF CHICAGO, ILLINOIS.

VELOCIPEDE.

SPECIFICATION forming part of Letters Patent No. 463,302, dated November 17, 1891.

Application filed July 11, 1891. Serial No. 399,155. (No model.)

*To all whom it may concern:*

Be it known that I, THOMAS O. DECKER, a citizen of the United States, residing at Chicago, in the county of Cook and State of Illinois, have invented certain new and useful Improvements in Velocipedes, of which the following is a specification, reference being had to the accompanying drawings, which are made a part hereof, and in which—

Figure 1:
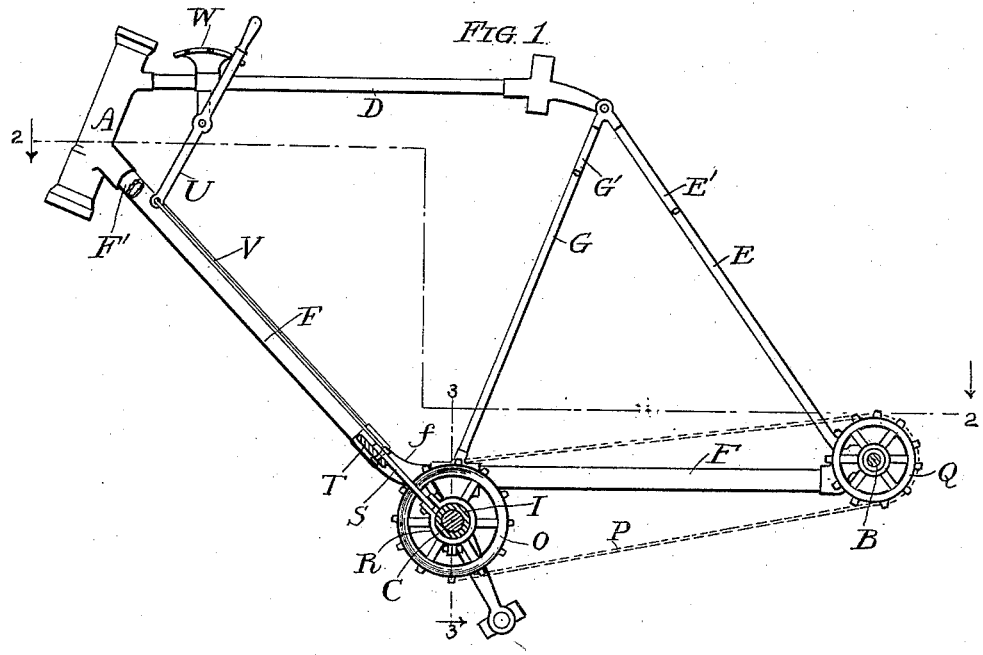
Figure 2:
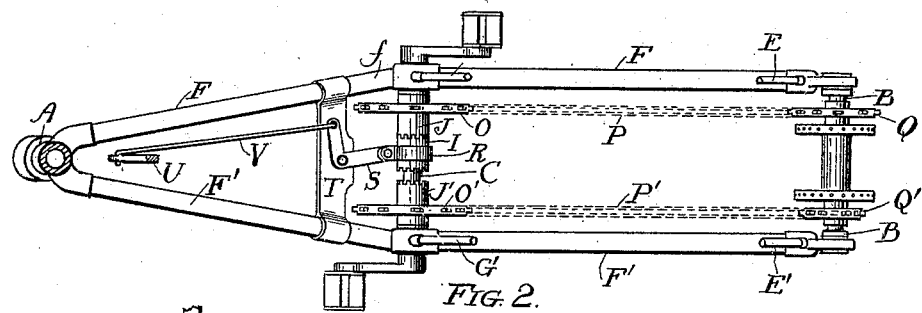
Figure 3:
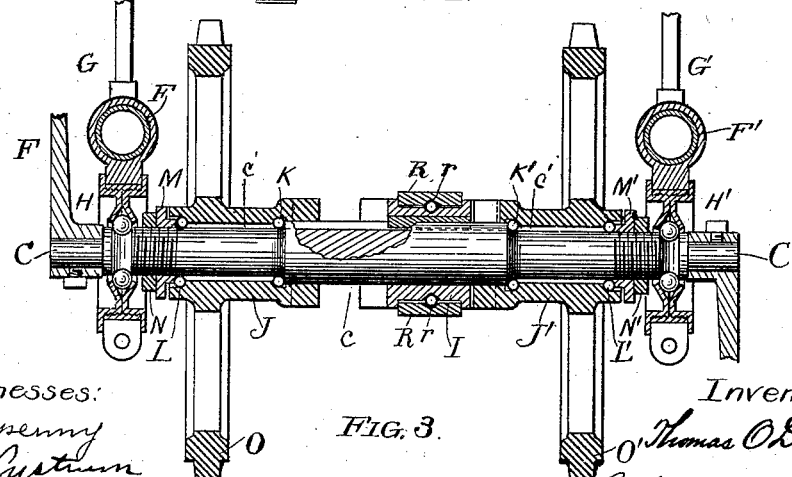

Figure 1 is a sectional elevation of the frame and driving-gear of a safety bicycle embodying the invention. Fig. 2 is a section thereof on the line 2 2, the parts below the plane of the section being shown in plan. Fig. 3 is a vertical section on the line 3 3, showing the parts on a larger scale.

The object of the present invention is to improve the construction of the gearing for transmitting motion from the crank-shaft to the shaft of the driving-wheel of a velocipede, and to improve the construction of the frames of safety bicycles, and to these ends the invention consists in certain features of novelty that are particularly pointed out in the claims hereinafter.

Referring to the drawings, A represents the sleeve through which the steering-bar passes; B, the axle of the rear or driving wheel, and C the shaft to which the pedal-cranks are rigidly attached.

D is a horizontal pipe or bar extending rearward from the sleeve A, and E E' a pair of bars joined to the rear end of bar D, and extending thence downward and rearward toward the rear axle B, their rear ends being joined to the rear ends of a pair of bars or pipes F F', the forward ends of which are joined to the sleeve A. The bars F F' are bent at $f$, so that the portions forward of the bends are inclined, while the portions behind the bends are horizontal.

G G' are a pair of upright braces, joined at their lower ends to the bars F and F', respectively, and at their upper ends to one or more of the bars forming the top side of the frame.

Heretofore instead of the two continuous bars F F', both extending from the front end of the frame to the rear axle, it has been the custom to use either a single bar extending from the sleeve A to about the point $f$, and there unite it to the front end of a fork that straddles the rear wheel, or else two bars extending from the sleeve to the crank-shaft boxes, and two more bars extending from said boxes to the rear axle. I prefer the construction shown in the drawings, as it is well adapted for use in connection with my differential gear, and aside from the construction of the gear it is a superior structure.

To the bars F and F' are secured, in any desired way, the journal-boxes H and H', in which the shaft C turns upon anti-friction balls, as shown by Fig. 3. Between these bearings is arranged all the gearing, and in this respect my invention differs from all other differential gears of which I am aware.

Connected to the central portion $c$ of the shaft C, by a spline and groove so as to be capable of endwise movement, but incapable of rotary movement relatively thereto, is the sliding member I of a double clutch, having upon its opposite ends clutch-teeth that are adapted to engage similar teeth on the other two members J J', respectively, which are mounted to turn loosely on the parts $c$ $c'$ of the shaft. Preferably the parts $c$ $c'$ of the shaft are of less diameter than the part $c$, forming a shoulder, and the members J and J' are counterbored for the reception of anti-friction balls K K' and L L', the latter being held to place by screw-collars M M' and jam-nuts N N'; but I desire to have it understood that the anti-friction balls may be dispensed with without departing from the spirit of my invention.

Rigid with the members J J' are sprocket-wheels O O', over which run sprocket-chains P P', which chains also run over sprocket-wheels Q Q' on the driving-axle B. One set of these sprocket-wheels (preferably Q Q') are of different diameters, so that a single revolution of the crank-shaft C will produce a greater or less number of revolutions of the driving-axle B, accordingly as the movable member I of the clutch is in gear with the one or the other of the loose members of the clutch.

The sliding member of the clutch is operated and controlled by means of the following mechanism: R is a metallic strap or ring fitting in a circumferential groove in the member I, and $r$ anti-friction balls interposed between them for reducing the friction. S is a bell-crank lever fulcrumed to a plate T, supported by the bars F F', said lever having one of its ends loosely connected to the strap R. U is a hand-lever fulcrumed to the bar D or to a plate secured to it, or to some other part of the frame or a connection thereof, and V a rod connecting one end of said lever to the free end of the bell-crank lever. When the hand-lever is at one extremity of its permitted movement, the member I is in gear with one of the loose members. When it is at the other extremity, it is in gear with the other of said loose members; and when it is in a position midway between these two extremes it is not in gear with either of them, a rack W with three notches being provided for holding the hand-lever in either of these positions. With this arrangement the machine may be geared without dismounting, for power or for speed, or it may be thrown out of gear and the pedals used for foot-rests while coasting.

I am aware that it has been proposed to provide a velocipede with differential gearing, and I do not claim such, broadly, as my invention?

Having thus described my invention, the following is what I claim as new therein and desire to secure by Letters Patent:

1. In a differential gear for velocipedes, the combination, with the driving-shaft, the crank-shaft, and journal-bearings therefor, of a double clutch mounted on the crank-shaft between said bearings, said clutch consisting of the sliding member I, splined to the part $c$, and the loose members J J' on parts $c\,c'$, the balls K K' L L', situated in counterbores in the loose members, the collars M M', means for transmitting motion from either of the loose members to the driving-shaft, and means for operating the clutch, substantially as set forth.

2. The combination of the crank-shaft C, the sliding member I of a double clutch splined thereto, the loose members J J', situated on opposite sides of the member I, the collars M M', holding the members J J' in place, the journal-bearings H H', situated outside of said collars, the cranks secured to the shaft C, and means for transmitting motion from the member J or J' to the driving-shaft, substantially as set forth.

THOMAS O. DECKER.

Witnesses:
L. M. HOPKINS,
N. C. GRIDLEY.